United States Patent [19]

Robertson et al.

[11] Patent Number: 5,070,169
[45] Date of Patent: Dec. 3, 1991

[54] WETTABLE, FLEXIBLE, OXYGEN PERMEABLE CONTACT LENS CONTAINING BLOCK COPOLYMER POLYSILOXANE-POLYOXYALKYLENE BACKBONE UNITS AND USE THEREOF

[75] Inventors: J. Richard Robertson; Kai C. Su, both of Alpharetta, Ga.; Merrill S. Goldenberg, Teaneck, N.J.; Karl F. Mueller, New York, N.Y.

[73] Assignee: Ciba-Geigy Corporation, Ardsley, N.Y.

[21] Appl. No.: 342,848

[22] Filed: Apr. 24, 1989

Related U.S. Application Data

[63] Continuation-in-part of Ser. No. 315,224, Feb. 23, 1989, abandoned, which is a continuation of Ser. No. 160,624, Feb. 26, 1988, abandoned.

[51] Int. Cl.$^5$ ............................................. C08G 77/04
[52] U.S. Cl. ........................................ 528/25; 528/26; 528/28; 528/29; 556/414; 556/421; 556/437; 556/438
[58] Field of Search ............... 528/26, 28, 25, 29; 556/421, 414, 437, 438

[56] References Cited

U.S. PATENT DOCUMENTS

| | | | |
|---|---|---|---|
| 4,740,533 | 4/1988 | Su et al. | 525/479 |
| 4,859,780 | 8/1989 | Molock et al. | 548/550 |
| 4,921,956 | 5/1990 | Molock et al. | 544/165 |

*Primary Examiner*—Melvyn I. Marquis
*Attorney, Agent, or Firm*—Luther A. R. Hall; William G. Hervey

[57] ABSTRACT

Contact lenses which are optically clear, wettable, flexible, and of high oxygen permeability in the aqueous ocular environment of use, of a block copolymer containing polysiloxane and polyoxyalkylene oxide units are disclosed, as well as the preparation thereof and methods of treating vision defects therewith.

3 Claims, No Drawings

WETTABLE, FLEXIBLE, OXYGEN PERMEABLE CONTACT LENS CONTAINING BLOCK COPOLYMER POLYSILOXANE-POLYOXYALKYLENE BACKBONE UNITS AND USE THEREOF

BACKGROUND OF THE INVENTION

1. Field of the Invention

This invention relates to ophthalmic devices, such as contact lenses and intraocular implants, and particularly contact lenses of a block copolymer containing polysiloxane and polyoxyalkylene oxide units possessing an advantageous blend of desirable properties including a) high oxygen permeability, b) good wettability, c) flexibility, and d) optical clarity in the ocular environment of use. The invention further relates to the polymers from which the ophthalmic devices are fabricated and the special macromers used to prepare the polymers.

2. Background of the Invention

The use of siloxane containing materials of various types in the fabrication of ophthalmic devices is well known.

Thus, in U.S. Pat. Nos. 3,996,187; 3,996,189; 3,341,490 and 3,228,741 there are described contact lenses fabricated from poly (organosiloxanes) containing fillers. While such lenses are generally soft and of high oxygen permeability, the use of fillers such as silica, is indicated in order to increase the otherwise generally poor tear strength and tensile strength. Also, such silicone rubber lenses are characteristically both hydrophobic and lipophilic.

U.S. Pat. No. 3,808,178 discloses hard contact lenses fabricated from copolymers of a polysiloxanylalkyl acrylate or methacrylate ester and an alkyl acrylate or methacrylate ester. The monomers and polymers of the patent are hydrophobic and are incompatible with hydrophilic materials such as hydroxyethyl methacrylate. While the disclosed lenses have increased oxygen permeability, they are rigid.

U.S. Pat. No. 4,136,250 discloses hydrogels of a copolymer of about 20 to about 90% of a hydrophilic (or mixture of hydrophilic and hydrophobic) monomer and about 10 to about 80% of a polyolefinic siloxane macromer which can be used to fabricate a contact lens. Typically, such materials are recited to possess a degree of swelling of about 10 to about 12%. It has been found, however, that the presence of substantial amounts of water therein limits the oxygen permeability of such materials.

U.S. Pat. No. 4,153,641 relates, in relevant part, to contact lenses fabricated from a polymer of a polyorganosiloxane terminated with vinylic groups, or copolymers thereof with other monomers. The exemplified products therein are hydrophobic in nature.

U.S. Pat. No. 4,486,577 relates to copolymers of about 8 to 70% of a polysiloxane macromer containing at least two vinyl groups and 30-92% of a monomer which is at least predominantly water insoluble to make polymers useful, for example, as contact lenses.

Generally, such prior art contact lens compositions are either insufficiently hydrophilic in terms of surface wettability to be acceptable to the contact lens profession, even though they may possess high oxygen permeability, or such contact lenses are of acceptable wettability but the hydrophilicity is coupled with water swellability, which tends to limit optimum oxygen permeability.

It is an object of the present invention to overcome these and other disadvantages of the art by providing ophthalmic devices, such as contact lenses and corneal implants, possessing a high degree of surface wettability and possessing a high degree of oxygen permeability not-withstanding their swellability by employing a crosslinked block polymer containing polysiloxane and polyalkylene oxide units.

A further object of the invention is to provide a method of correcting visual defects in the form of refractive errors by fitting to the patient's eye in need of the same, a corrective contact lens of such polymer. These and other objects of the invention are apparent from the following detailed description of the invention.

Another object of the invention is to provide novel macromers for accomplishing the above objects.

SUMMARY OF THE INVENTION

The present invention is directed to macromers, polymers derived therefrom, ophthalmic devices obtained from such polymers as well as methods of manufacturing each of the foregoing. Each of the above invention materials are comprised of segments "Seg" of the formula

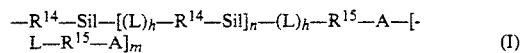

$$-R^{14}-Sil-[(L)_h-R^{14}-Sil]_n-(L)_h-R^{15}-A-[-L-R^{15}-A]_m \qquad (I)$$

wherein Sil is a divalent poly(disubstituted siloxane), A is a divalent polyoxyalkylene oxide (which may be substituted), $R^{15}$ is oxygen or an amino nitrogen, $R^{14}$ is a bond, an amino nitrogen, or, when the adjacent atom of Sil is other than silicon, it is an oxygen, L is a divalent linking group, n is an integer of 0-3, and m is an integer of 0-10.

DETAILED DESCRIPTION OF THE INVENTION

The present invention relates to novel macromers, polymers fabricated therefrom, ophthalmic devices prepared from the polymers (especially contact lenses and intraocular lenses), as well as methods of manufacture of each. The ophthalmic devices ultimately fabricated are optically clear, hydrolytically stable, biologically inert, wettable, flexible, of good mechanical strength, oxygen permeable, and when fully swollen in its environment of use has a water content of at least 10%.

The macromer is a reactive monomer having a segment "Seg" of the formula

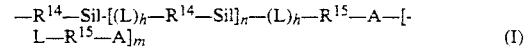

$$-R^{14}-Sil-[(L)_h-R^{14}-Sil]_n-(L)_h-R^{15}-A-[-L-R^{15}-A]_m \qquad (I)$$

more preferably a segment "Grp" of the formula

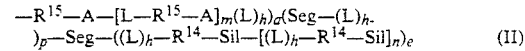

$$-R^{15}-A-[L-R^{15}-A]_m(L)_h)_a(Seg-(L)_h-)_p-Seg-((L)_h-R^{14}-Sil-[(L)_h-R^{14}-Sil]_n)_e \qquad (II)$$

and most preferably of the formula

$$Cap-Grp-Cap \qquad (III)$$

wherein
 'Cap', 'Grp', 'Sil', are singular variables (i.e. the 'a' within 'Cap' is not a separate variable);

a is zero or 1;
e is zero or 1;
a+e=1;
h is 1, but may also be zero when the atom of Sil, to which it would otherwise be attached, is a carbon atom;
n is zero-3;
m is zero-10;
p is zero-7;
each $R^{14}$ is a bond, —N($R^1$)—, or —O— except that $R^{14}$ cannot be —O— if it is attached directly to a silicon atom;
$R^{15}$ is —O— or —N($R^1$)—, with $R^1$ being H, $C_{1-4}$-alkyl, or phenyl;
each Sil is independently of the formula

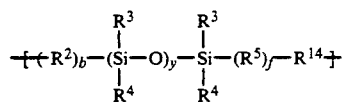  (IV)

in which $R^2$ and $R^5$ are each independently $C_{1-7}$alkylene, carbonyl, $C_{1-6}$alkylenecarbonyl, $C_{1-4}$alkylene-(oxy-$C_{1-4}$alkylene)$_g$—[g being an integer of 1-10], or $C_{1-4}$alkylene-oxy-$CH_2$-(hydroxy $C_{1-4}$alkylene)-$CH_2$—;
each b and f is independently 0 or 1;
each $R^3$ and $R^4$ is independently selected from $C_{1-18}$alkyl and aryl of up to 12 carbon atoms; and
each y is independently 1-200;
each L is independently selected from —$L^1R^6L^2$— wherein $L^1$ and $L^2$ are each independently

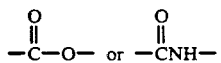

in which the oxygen or amino nitrogen respectively is bound to $R^6$, or independently $L^1$ and $L^2$ may also independently be

or a bond, and
each $R^6$ is independently selected from
i) a divalent aliphatic group of up to 25 carbon atoms;
ii) of the formula —($C_{1-20}$aliphatic)$_j$—$Q_k$—[(5-7 membered cycloaliphatic or aryl of up to 25 carbon atoms)-$Q_{(k1)}$ —($C_{1-20}$aliphatic)$_{(j1)}$]$_D$—, (IX)
each of j, k, d and q being independently zero or one, but if j=0, k=0 and if q=0; d=0; wherein each aliphatic group in i) and ii) above may be interrupted at any point by Q, and each aliphatic, cycloaliphatic and aryl group in i) or ii) may be singly or multiply substituted by one or more of halogen, hydroxy, $C_{1-4}$alkyl, carboxy or $C_{1-12}$ perhaloalkyl;
Q is

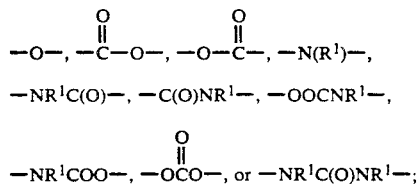

and
D is 1-3;

each A is independently of the formula

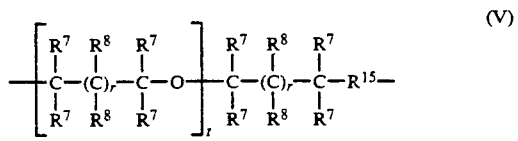  (V)

wherein
each r is 0-4;
t is 3-200 in which at least 30%, more preferably at least 50%, still more preferably at least 75%, most preferably 100%, of the A groups of formula V within any one macromer of formulae I-III are limited to having homopolymeric sub-blocks of not more than 15 repeating units, preferably not more than 10 repeating units, more preferably not more than 7 repeating units, most preferably not more than 4 repeating units;
each $R^7$ is independently selected from groups i) and iii) below and each $R^8$ is independently selected from groups i)–iv) below:
i) hydrogen, halogen, unsubstituted $C_{1-16}$alkyl, substituted $C_{1-16}$alkyl, unsubstituted $C_{2-16}$alkenyl, and substituted $C_{2-16}$alkenyl, wherein a) the substituents on the alkyl and alkenyl groups in i) are independently selected from fluoro, $C_{1-16}$alkoxy, $C_{2-16}$alkanoyloxy, $C_{1-16}$alkoxy-C(O)—$C_{2-16}$alkenyloxy-C(O)—, $C_{3-16}$alkenyloxy, aryl of up to 10 carbon atoms, aryloxy of up to 10 carbon atoms, aroyl of up to 11 carbon atoms, aroyloxy of up to 11 carbon atoms, aryl (of up to 10 carbon atoms)-oxycarbonyl, $C_{3-8}$cycloalkyl, $C_{3-8}$cycloalkoxy, ($C_{3-8}$cycloalkyl)-carbonyloxy, ($C_{3-8}$cycloalkoxy)carbonyl, oxacycloalkyl of up to 7 carbon atoms, oxacycloalkoxy of up to 7 carbon atoms, oxacycloalkoxy (of up to 7 carbon atoms)-carbonyl, and oxacycloalkyl (of up to 7 carbon atoms)-carbonyloxy; and b) each alkyl and alkenyl group in a) being unsubstituted or further substituted by fluoro, $C_{1-6}$alkyl, or $C_{1-6}$alkoxy provided that said last mentioned alkoxy is not bound to a carbon already singly bound to another oxygen atom; and
ii) $C_{1-16}$alkoxy, $C_{2-16}$alkanoyloxy, $C_{1-16}$alkoxy-C(O)—, $C_{2-16}$alkenyloxy-C(O)— and $C_{3-16}$alkenyloxy, each of which may be further substituted by fluoro, aryl of up to 10 carbon atoms, or $C_{1-6}$alkoxy provided that the last mentioned alkoxy is not bound to a carbon atom which is singly bound to another oxygen;
iii) aryl of up to 10 carbon atoms, $C_{3-8}$cycloalkyl, and oxacycloalkyl of up to 7 carbon atoms, each of which is unsubstituted or substituted by a substituent selected from those indicated in i)a) and b) above;
iv) aryloxy of up to 10 carbon atoms, cycloalkoxy of up to 8 carbons, cycloalkyl (of up to 8 carbons)-C(O)O—, cycloalkoxy (of up to 8 carbons)-carbonyl, aroyloxy of up to 11 carbons, oxacycloalkoxy of up to 7 carbons, oxacycloalkenyloxy of up to 7 carbons, oxacycloalkoxy (of up to 7 carbon atoms)-carbonyl, oxacycloalkyl (of up to 7 carbon atoms)-carbonyloxy, aryloxy of up to 11 carbon atoms, and aroyloxy of up to 11 carbon atoms, each of which is unsubstituted or substituted by fluoro, $C_{1-6}$alkyl, or $C_{1-6}$alkoxy, provided said last mentioned alkoxy is not bound to a carbon atom which is singly bound to another oxygen; and 2 adjacent groups $R^7$ and $R^8$, together with the atoms to which they are attached may define a 5–8 membered cycloalkyl, cycloalkenyl, or oxacycloalkyl ring or a 6–14 membered bicyclo-ring;

Each Cap is independently selected from
i) a vinyl containing group of the formula

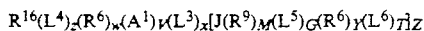  (VI)

or ii) a group of the formula

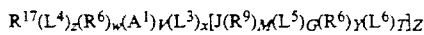  (VII)

at least one Cap per macromer being of formula VI; wherein
R$^{16}$ of the formula

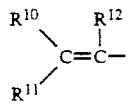  (VIII)

in which R$^{12}$ is hydrogen or C$_{1-7}$alkyl and each of R$^{10}$ and R$^{11}$ is independently H, C$_{1-7}$alkyl, or —COOR$^{13}$ with R$^{13}$ being H or C$_{1-4}$ alkyl;

w, x and z are each independently zero or one but if w is zero, one of x and z must be zero;

L$^3$ is

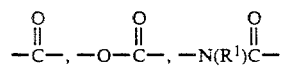

with the right hand portion attached to Grp provided that the Grp atom to which L$^3$ is attached is not a carbonyl carbon an amido nitrogen or a carboxy oxygen and L$^3$ is —O— or —NR$^1$— when such Grp atom is a carbonyl carbon;

L$^4$ is

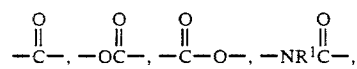

—N(R$^1$)CN(R$^1$)—or

when w is one, and selected from the same group as L$^3$ when w is zero;

A$^1$ is

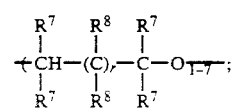

L$^5$ is

with the carbonyl attached to R$^9$ or J;
L$^6$ is

with the nitrogen attached to R$^6$ or R$^9$;
J is —O— or —NH—;
G, Y, M, T, V, and Z are independently 0 or 1, but if Y is zero, then G is zero and M is one; and
R$^9$ is

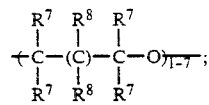

and R$^{17}$ is selected from
a) H, NH$_2$, OH, —NCO, —NCS,

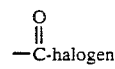

and COOR$^{12}$ when the non-R$^{17}$ atom to which it is attached is a non-carbonyl saturated carbon or the non-R$^{17}$ atom to which it is attached is a carbon which is part of a ring;
b) H,

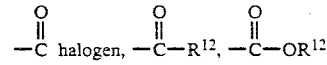

and R$^{12}$ when the non-R$^{17}$ atom to which it is attached is an oxygen other than a carboxy oxygen;
c) H and R$^{12}$, when the non-R$^{17}$ atom to which it is attached is a carboxy oxygen;
d)

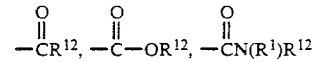

and R$^{12}$ when the non-R$^{17}$ atom to which it is attached is an amino nitrogen, or R$^{12}$ when the non-R$^{17}$ atom to which it is attached is an amido nitrogen;
e) OH, R$^{12}$, NH$_2$, and —NHR$^{12}$ when the non-R$^{17}$ atom to which it is attached is a carboxy carbon; and
f) H, OH, hal, —OR$^{12}$ when the non-R$^{17}$ atom to which it is attached is silicon.

The macromers of formulae I, II, and III or mixtures thereof are polymerized into polymers which may be shaped into ophthalmic devices such as intraocular implants and contact lenses or utilized as active agent releasing materials, especially release rate controlling membranes or matrices in transdermal drug delivery devices or as tablet release matricies in various applications. The polymers and ophthalmic devices of the invention will swell, when in contact with sufficient aqueous medium, until a fully swollen water content of from at least 10% to about 95% has been reached.

The ophthalmic devices and polymers of the invention exhibit a receding contact angle of less than 60; the measurement of which is conveniently performed using a modified "Wilhelmy Plate" technique, as described for example in J. D. Androde et al, *Surface and Interfacial Aspects of Biomedical Polymers*, Vol. 1, *Surface Chemistry and Physics*, Plenum Press, 1985, wherein a specimen sample, in the form of a plate of known dimensions, is immersed into the wetting solution, pure water, at a slow controlled rate, e.g. at 2-20 mm per minute.

The invention ophthalmic devices also have a high oxygen permeability, Dk. Dk is measured using a modification of ASTM standard D3985-81 in that a) 21% oxygen, i.e. air, is used instead of 99-100% oxygen, b) 0.5 m² surface area is used instead of 100 m², and a) the humidity is 95-100% relative humidity instead of 0% relative humidity. Typically, conventional, fully swollen polyhydroxyethylmethacrylate (pHEMA) lenses which are sparingly crosslinked have a Dk of 5-7 ($5-7 \times 10^{-10}$ mm.cc$O_2$/cm² sec mmHg) or $5-7 \times 10^{-10}$ cm/sec. The oxygen permeability of the instant invention ophthalmic devices have Dk values generally greater than 7-10 ($10^{-10}$ cm/sec).

Preferred macromers of formulae I, II and III are those wherein n is zero or one, most preferably zero. Another group of preferred macromers of formulae I-III are those where m is 0-4, more preferably zero or one, most preferably zero. A highly preferred group of macromers of formulae I-III are those wherein both m and n are zero or one, most preferably both m and n are zero, to result in Seg¹, a most highly preferred embodiment of Seg, of the formula $$-R^{14}-Sil-(L)_h-R^{15}-A- \qquad (I^a)$$

and Grp¹, a most highly preferred embodiment of Grp, of the formula $$-R^{15}-A-(L)_h)_a-Seg^1-((L)_h-R^{14}-Sil)_e \qquad (II^a).$$

Within Sil above, b and f are each independently preferably one, with a highly preferred embodiment being when both b and f are one;

$R^2$ and $R^5$ are each independently preferably $C_{1-7}$ alkylene, $C_{1-4}$alkylene-(oxy-$C_{2-4}$alkylene)$_g$- (wherein g is 1-10, preferably 1-4, more preferably 1-2, most preferably 1) or $C_{2-4}$alkylene-oxy-$CH_2$-(hydroxy-$C_{1-2}$alkylene)-$CH_2$, more preferably $C_{1-4}$alkylene or —CH$_2$—(OC$_2$H$_4$)$_g$— with g preferably 1 or 2, most preferably 2. In all cases within $R^2$ and $R^5$, alkylene of greater than 2 carbons is preferably branched.

Within Sil of formula IV, y is preferably 5-100, more preferably 10-50, most preferably 20-30. A particularly useful subembodiment has y=25-29, especially when a=1 and e=zero.

$R^{14}$ is preferably a bond or —O—, more preferably —O—.

$R^1$ is preferably $CH_3$ or H, more preferably H.

Each $R^3$ and $R^4$ is independently preferably $C_{1-7}$alkyl or phenyl, more preferably $C_{1-4}$alkyl, still more preferably methyl or ethyl, most preferably methyl. A most preferably embodiment of Sil is when all of $R^3$ and $R^4$ are the same.

$R^{15}$ is preferably —O— or —NH—, more preferably —O—.

Each h is independently preferably 1, most preferably each h is one.

p is preferably 0-5, still more preferably 0-3, most preferably 0 or 1.

As stated above, linking group L is $L^1R^6L^2$ wherein $L^1$ and $L^2$ are independently —COO— or —C(O)NH— (in which the oxygen or amido nitrogen is bound to $R^6$) or

or a bond. Preferably, each $L^1$ and $L^2$ is independently —COO—, —C(O)NH—, or

more preferably

or —C(O)NH— and most preferably

In a most highly preferred embodiment, all of the $L^1$ groups are the same and all of the $L^2$ groups are the same. In a still more highly preferred subembodiment, $L^1$ and $L^2$ are the same groups.

Each $R^6$ is preferably independently selected from
i) a divalent aliphatic group of up to 12 carbon atoms, preferably up to 7 carbon atoms, more preferably up to 4 carbon atoms;
ii) -($C_{1-20}$aliphatic)$_j$-$Q_k$[(5-7 membered cycloaliphatic or aryl of up to 25 carbon atoms)-$Q_d$-($C_{1-20}$ aliphatic)$_q$]$_D$- each of j, k, d and q being 0 or 1 but if j is zero, k must be zero and if q is zero, d must be zero; preferably each of the $C_{1-20}$ aliphatic groups in ii) are $C_{1-12}$ aliphatic, more preferably $C_{1-7}$ aliphatic, still more preferably $C_{1-4}$aliphatic, most preferably $C_{1-2}$ aliphatic; preferably the $C_{5-7}$ cycloaliphatic is $C_6$ cycloaliphatic, most preferably a cyclohexane; preferably the aryl of up to 25 carbons is up to 14 carbons, more preferably up to 10 carbons, still more preferably of 6 carbons, most preferably a phenyl ring; preferably k is zero and preferably d is zero, but most preferably k and d are each zero; wherein each aliphatic group within i) and ii) above may be interrupted at any point by Q and each aliphatic, cycloaliphatic, and aryl group in i) or ii) is unsubstituted or substituted by one or more of halogen (preferably fluorine or chlorine, most preferably fluorine), hydroxy, $C_{1-4}$alkyl (preferably methyl, ethyl, propyl, or isopropyl, more preferably methyl or ethyl, most preferably methyl), carboxy, or $C_{1-12}$perhaloalkyl (preferably $C_{1-7}$ per haloalkyl, more preferably $C_{1-4}$perhaloalkyl, still more preferably perhalomethyl, perhaloethyl, or perhalopropyl, most preferably perhalomethyl, with the halogen atom being preferably the same and preferably fluorine or chlorine, most preferably fluorine. D is preferably 1 or 2, more preferably 1.

Most preferably, the $R^6$ aliphatic groups are not interrupted by Q, and preferably are unsubstituted. Also most preferably, the $R^6$ cycloaliphatic groups are substituted by 1-4 substituents, preferably 1-3 substituents, which substituents are preferably selected from halogen (preferably fluorine), hydroxy, and $C_{1-4}$alkyl (preferably methyl, ethyl, propyl or isopropyl, most preferably methyl). In a most highly preferred embodiment each of the substituents is the same. Preferably, one of j and q is zero when the $R^6$ group contains a cycloaliphatic. The most highly preferred cycloaliphatic containing $R^6$ is (5-yl-1,3,3-trimethylcyclohexyl)-methyl (the residue of isophorone diisocyanate absent the two isocyanate groups).

Preferably, the $R^6$ aryl groups are unsubstituted or substituted by 1–4 substituents, preferably unsubstituted or substituted by 1 or 2 substituents, more preferably unsubstituted or substituted by 1 substituent which substituents are preferably selected from halogen (preferably fluorine), hydroxy, and $C_{1-4}$alkyl, more preferably $C_{1-4}$alkyl (preferably methyl, ethyl, propyl, or isopropyl, more preferably methyl). When more than one substituent is present per aryl, the substituents on any one aryl is preferably the same. A most highly preferred aryl embodiment of $R^6$ is toluenediyl.

A preferred subclass of $R^6$ includes: ethane-1,2-diyl; propane-1,2-diyl; propane-1,3-diyl; tetramethylene-diyl; hexane-1,6-diyl; cyclohexane-1,2-diyl; cyclohexane-1,3-diyl; 1,4-phenylene; bis[4-yl-cyclohexyl]methane; bis(4-yl-cyclohexenyl)methane; bis(4-yl-phenyl)methane; toluene-2,4-diyl; toluene-2,6-diyl; m- and p-tetramethylene-diyl; toluene-1,2-diyl; toluene-1,4-diyl; 3,3'-dichloro-4,4'-diyl-biphenyl; naphthalene-1,5-diyl; dihydro-toluene-diyl; tetrahydrotoluene-diyl; (5-yl-1,3,3-trimethylcyclohexyl)methyl; trimethylhexane-1,6-diyl (especially 2,2,4-trimethylhexane-1,6-diyl and 2,4,4-trimethylhexane-1,6-diyl); diethylfumarate-2,2'-diyl; 1-carboxypentane-1,5-diyl; naphthalene-1,2-, 1,3-, 1,6-, 1,7-, 1,8-, 2,7-, and 2,3-diyl; 1-methylnaphthalene-2,4- and 2,7-diyl; methylcyclohexane-1,4-diyl, 6(7)-methyl-naphthalene-1,3-diyl; biphenyl-4,4'-diyl; 3,3'-dimethoxybisphenyl-4,4'-diyl; 2,2'-dimethylbiphenyl-4,4'- and 3,3'-diyl; bis(4-ylphenyl)ethane; and bis(4-ylphenyl)ether.

The polyalkylene oxide groups are of formula V and are homo or copolymeric blocks having a total of 3–200 alkylene oxide units and an additional terminating alkylene oxide or amine. However, no individual A has a subblock in excess of 15 repeating units. The portion of the alkylene oxide alkylene chain in the macromer backbone is a straight chain of 2 (r=zero) to 6 (r=4) carbon atoms which may be unsubstituted or substituted as set forth previously.

Preferably the number of alkylene oxide units (i.e. t) is 3–150, more preferably 4–100, still more preferably 5–75, still even more preferably 6–70. Within this group are two highly preferred subembodiments, a) those with t of 25–70, preferably 50–68, most preferably 60–66 and b) those with t of 8–50, preferably at least 9, more preferably at least 10, still more preferably 13–35, even more preferably 15–30, most preferably 20–25, especially about 22.

Also highly preferable are two embodiments wherein at least 30% of the A groups within the macromers of formulae I–III consist of 32% and 35%, respectively, of polyethylene glycol and 68% and 65%, respectively of polypropylene glycol, the polyethylene glycol blocks being of no more than 3 repeating units each and the polypropylene glycol blocks being of no more than 7 repeating units each.

While it is highly preferable that each A be of the same structure throughout the macromer, there is no such absolute requirement. Preferably at least 20% more preferably 25%, still more preferably 33%, yet more preferably 50%, even more preferably 75% and most preferably at least 90% of the A groups within any one macromer are the same.

Within each A group, there are two highly preferred subembodiments:
a) homopolymeric A units,
b) copolymeric A units of the 'EXE' type with the 'X' portion having approximately twice the number of repeating units as either 'E' (i.e. a poloxamer or reverse poloxamer like grouping).

While these two arrangements are highly preferred, other arrangements of alkylene oxide copolymeric type are also suitable.

Substituents on the alkylene oxide backbone portion (i.e. $R^7$ and $R^8$) are preferably selected from as set forth above. Preferably, each alkyl group within $R^7$ or $R^8$ whether alone or as a part of a larger group, has up to 4 carbon atoms, more preferably methyl, ethyl, butyl, or t-butyl (provided that adjacent groups on a ring cannot each be t-butyl), most preferably methyl. Preferably, each alkenyl within $R^7$ or $R^8$, whether alone or as part of a larger group has 2–4 carbons, more preferably $C_{2-3}$alkenyl. An $R^7$ or $R^8$ aryl is preferably phenyl or naphthyl, most preferably phenyl. Cycloalkyl groups within $R^7$ and $R^8$ preferably have 5–6 ring members, most preferably 6 ring members. Oxacycloalkyl groups within $R^7$ or $R^8$ are preferably of 5–6 ring members, more preferably 6 members, each having only a single heteroatom in the ring which heteroatom is oxygen.

While the entire A unit may have a substantial fluorine substituent content, it is preferably at least 25% halogen free, more preferably at least 30% halogen free, still more preferably at least 40% halogen free, yet more preferably at least 60% halogen free, and most preferably substantially halogen free.

Preferably $R^7$ is hydrogen, $C_{1-7}$alkyl more preferably $C_{1-4}$alkyl, more preferably methyl; substituted $C_{1-4}$alkyl, most preferably substituted methyl; phenyl, substituted phenyl, benzyl, substituted benzyl, cyclohexyl, or $C_{4-5}$oxacycloalkyl, preferably $C_5$-oxacycloalkyl; each of the "substituents" preferably being $C_{1-6}$alkoxy (more preferably $C_{1-4}$alkoxy), fluorine, or when substituted on a group other than alkyl, $C_{1-6}$alkyl; the most preferable substituents being methoxy, fluorine, and when substituted on other than alkyl, methyl. Substituents on aryls within $R^7$ are preferably in the p-position. $R^8$ is preferably selected from the same group as $R^7$ and $C_{1-4}$alkoxy, phenoxy, and $C_6$cycloalkoxy, more preferably the same group as $R^7$.

At least one Cap per macromer is independently of Formulae VI or VII, but preferably the macromers have both Cap groups of formula VI. Most preferably, within each macromer the Cap groups are the same.

Preferably, the Cap groups are of formula VI in which $R^{16}$ is preferably a vinyl group of formula VIII in which $R^{11}$ is hydrogen, of $R^{10}$ is hydrogen, $C_{1-4}$alkyl (preferably methyl), or —COOR$^{13}$, with $R^{13}$ being H or methyl. More preferably the formula VI Cap groups have an $R^{16}$ which is a vinyl of formula VIII in which $R^{10}$ and $R^{11}$ are each hydrogen and $R^{12}$ is hydrogen or methyl.

Preferred Cap groups, whether of formula VI or VII are those wherein
a) Z, w, x, z and V are all zero;
b) Z, w, V and x are all zero, z is one, and $L^4$ is

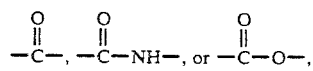

-continued most preferably 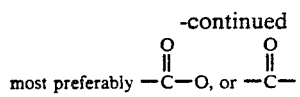

with the carbonyl in each case attached to $R^{16}$ or $R^{17}$;

c) Z, z and V are all zero, w and x are each one, $R^6$ is of formula IX wherein j, k, d and q are each zero, and D is one, and the aryl thereof is phenyl; and $L^3$ is

with the nitrogen thereof attached to $R^6$;

d) Z, w and x are zero, and V are one, $A^1$ is —CH$_2$CH$_2$O— with the carbon thereof attached to $L^4$, $L^4$ is

with the carbonyl thereof attached to $R^{16}$ or $R^{17}$;

e) Z, V and x are zero, z and w are one, $L^4$ is

with the carbonyl attached to $R^{16}$ or $R^{17}$, and $R^6$ being alkylene or hydroxy substituted alkylene of from 2-15 carbon atoms; and f) those groups of a-e above except that Z is one and wherein
  i) M and T are one, G and Y are zero, $R^9$ is $C_{2-15}$ alkylene or $C_{2-15}$hydroxy substituted alkylene and $L^6$ is

with the nitrogen attached to $R^6$;

ii) M, G, Y and T are all one, $R^9$ is $C_{2-15}$alkylene or $C_{2-15}$hydroxy substituted alkylene, $L^f$ is —NH-COO— with the oxygen bound to $R^9$, $R^6$ is as defined above, preferably a divalent aliphatic or cycloaliphatic or arylene group and $L^6$ is

with the nitrogen attached to $R^6$;

iii) M is zero, G, Y and T are all one and $L^5R^6L^6$ is

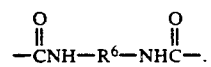

Highly preferred vinyl containing Cap groups terminating the macromer are acryl, methacryl, and styryl groups bound directly to or through an ethyloxy or oxyethyloxy to the balance of Cap or to the non-Cap portion of the macromer.

Specifically preferred embodiments of the present invention within formulae II$^a$ and III include those wherein (i) Sil is

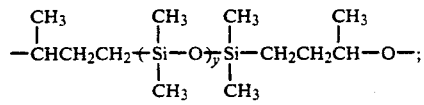

a is one;
e is zero;
$R^{14}$ and $R^{15}$ are each —O—;
L is

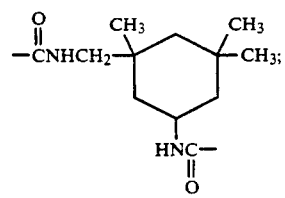

h is one;
A is (CH$_2$CH$_2$O)$_i$; and
p is zero;
m is zero;
Cap is

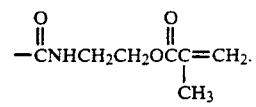

(ii) Sil is

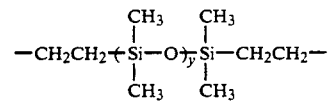

(especially y of about 4, 7, and about 16);
e is one;
$R^{14}$ is a bond;
$R^{15}$ is —O—;
a is zero;
L is

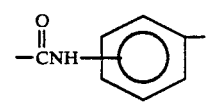

with the phenyl ring thereof bound to Sil;
p is zero;
n is zero;
A is —(CH$_2$CH$_2$O)$_r$—,

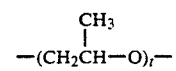

or a poloxamer or reverse poloxamer having t polyoxyalkylene units per A group (especially t of about 6-8, about 45-55, and about 90-95); and
each Cap is

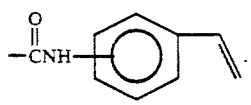

An even more highly preferred macromer of formulae I–III are those within formula I$^a$ and II$^a$ having each Cap independently selected from formulae VI and VII in which Z is zero to result in Cap$^1$ of the formulae $$R^{16}(L^4)_z(R^6)_w(A^1)_v(L^3)_x \qquad (VI^a)$$

and $$R^{17}(L^4)_z(R^6)_w(A^1)_v(L^3)_x \qquad (VII^a)$$

and macromers of the formula $$Cap^1\text{—}Grp^1\text{—}Cap^1 \qquad (II^b).$$

Very highly preferred macromers of formula II$^b$ have R$^{16}$ in formula VI$^a$ selected from those of formula VIII wherein each of R$^{10}$–R$^{12}$ is independently hydrogen or methyl. Also preferred within this very highly preferred group are those wherein
V is zero.
(iii) Sil is

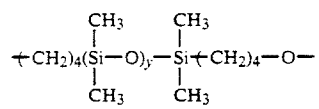

(especially with y of about 16–20);
a is zero;
e is one;
p is zero;
n is zero;
R$^{15}$ is —O—;
R$^{14}$ is oxygen;
L is

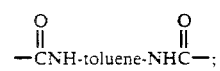

each Cap is

A is a block copolymer of

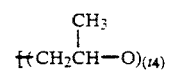

and —(CH$_2$CH$_2$—O)(t$_5$)]t$_6$ (especially when [(t$_4$)+(t$_5$)](t$_6$)=about 30–70).

In the foregoing, all alkyl groups whether mentioned alone or as part of another group are preferably C$_1$–C$_4$-alkyl, such as methyl, ethyl, propyl and butyl, especially t-butyl, with the exception that adjacent groups on aryl rings cannot each be t-butyl. These alkyl groups may be straight chain or branched chain. When the alkyl is a substituent on a phenyl ring, it is preferably attached at the para position. Preferable alkenyl groups, whether alone or as part of another group, are preferably C$_2$–C$_4$alkenyl, such as ethenyl, propenyl and butenyl. Preferred aryl groups (whether alone or as part of another group) are phenyl and naphthyl, more preferably phenyl. Preferably the aryl groups are still further substituted by C$_1$–C$_4$alkyl, more preferably t-butyl, most preferably in the para position.

Color may be added to the polymerized material or to the macromers via typical dying techniques. One such manner is by insuring hydroxy groups are introduced onto the macromer backbone or substituent thereof.

Typical color groups useful in these embodiments include, but are not limited to, the hydroxy reactive dyes known in the art under the tradename Remazol, manufactured by American Hoechst. Examples of the Remazol dyes which are especially useful are:

Remazol Brill Blue RW (Color Index Code: Reactive Blue 19);

Remazol Yellow GR (Color Index Code: Reactive Yellow 15);

Remazol Black B (Color Index Code: Reactive Black 5);

Remazol Golden Orange 3GA (Color Index Code: Reactive Orange 78); and

Remazol Turquoise P (Color Index Code: Reactive Blue 21);

all of which have at least one group of the formula $$-SO_2-CH_2CH_2O-SO_3(-)$$

which reacts with the polymer or monomer hydroxy group to yield

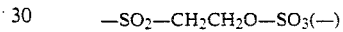

or

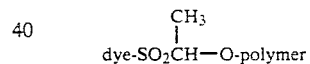

group, preferably the former. In such a manner, both excess free hydroxy groups are disposed of and colored contact lenses can be realized simultaneously.

If the polymerized macromers set forth above have inherently too low a water content, i.e. below 10% water content, the polymer is not within this invention. However, the macromers can be copolymerized with hydrophilic modifier so as to increase the water content to be within the instant invention. Whether the hydrophilic modifier is needed or not, and the amount which is needed, is dependent upon the desired polymer water content. Preferably, when the hydrophilic modifier is present, in accordance with the above, it is present in an amount of up to about 50% by weight preferably about 1% to about 30%, more preferably about 5% to about 25%, still more preferably about 10% to about 15% of the resultant polymer.

In addition to the hydrophilic modifier, other comonomers which may be present in the polymer are monomers coreactive with the monomer of formula I. Such additional monomers may be present in a minor amount of up to about 20% by weight of the resultant polymer. When such comonomers are excessively hydrophobic, additional hydrophilic modifier may be incorporated so as to achieve the appropriate water content.

The hydrophilic modifier is a monomer which is coreactive with a monomer of formula I and is typically selected from a) polyethylene glycols of the formula $$R^{18}-\overset{\overset{O}{\|}}{C}-O-(CH_2CH_2O)_{n1}R^{19} \qquad (A)$$

or b) pyrrolidones of the formula $$R^{18}-N\underset{\diagdown\diagup}{\overset{\diagup\diagdown}{\big\langle}}\overset{O}{\|} \qquad (B)$$

wherein $R^{19}$ hydrogen or $C_1$-$C_7$ alkyl, preferably $C_{1-4}$ alkyl, and $n_1$ is an integer of from 1-25 or c) of the formula $$(R^{20}\text{-}R^{21})_{(z')}R^{24} \qquad (C)$$

wherein $R^{18}$ is a polymerizable or reactive moiety selected from i) ethylenically unsaturated radicals, preferably vinyl, 1-methylvinyl, 2-methylvinyl, or allyl, ii) anhydrides, iii) amines, iv) acids, v) esters, vi) amides, vii) ethers, viii) acid halides; $R^{20}$ is selected from i) $R^{18}$ and ii) epoxy groups, especially glycidyl, iii) isocyanates or isothiocyanates, and iv) hydroxy;

$R^{21}$ is selected from i) a divalent aliphatic group of up to 25 carbon atoms, preferably alkyl, alkenyl or alkynyl, which may also be interrupted, or terminated, or interrupted and terminated by oxy, carboxyloxy, amino, aminocarbonyl, oxycarbonyl, ureido, oxycarbonylamino, or carbonylamino;

ii) a divalent 5-7 membered cycloaliphatic or a 5-7 membered cycloaliphatic-$C_1$-$C_{20}$-aliphatic which may also be interrupted, terminated, or interruted and terminated as in group i) above except that said interruptions cannot occur within said cycloaliphatic portions;

iii) a divalent arylene having 6-25 carbon atoms which is unsubstituted or substituted by at least one substituent selected from halogen, $C_{1-C4}$ alkyl, and $C_1$-$C_{12}$ perhaloalkyl;

iv) a divalent aralkyl or alkaryl or -alkylene-arylalkylene- having 7-25 carbon atoms which is uninterrupted or interrupted in the alkyl portion, or terminated, or interrupted in the alkyl portion and terminated with an interrupting or terminating group as mentioned in i) above, and each of said uninterrupted, interrupted, and terminated aralkyl and alkaryl groups is further unsubstituted or substituted by a substituent selected from halogen, $C_{1-4}$ alkyl, and $C_{1-12}$ perhaloalkyl;

$$\text{v)} \;-[\overset{R^{22}}{\underset{|}{CH}}-\overset{R^{23}}{\underset{|}{CH}}-(CH_2)_{\overline{(nb)}}-O]_{\overline{(na)}}\overset{R^{22}}{\underset{|}{CH}}-\overset{R^{23}}{\underset{|}{CH}}-(CH_2)_{\overline{(nb)}} \qquad (D)$$

wherein a) $R^{22}$ is hydrogen, $R^{23}$ is methyl, and (nb) is zero;

b) $R^{22}$ is methyl, $R^{23}$ is hydrogen, and (nb) is zero;

or c) $R^{22}$ and $R^{23}$ are hydrogen and (nb) is 1;

and (na) is an integer of 8-100; (z') is an integer of 1 up to the valence of $R^{24}$ and where (z') is less than the valence of $R^{24}$, the remaining valences are taken up with hydrogens; and $R^{24}$ is a hydrophilic group selected from i) morpholino; cyclic amide radicals of 5-7 ring members; saturated and unsaturated cyclic N,N-diamide radicals of 5-6 ring members; groups of the formula $$-N\underset{\diagdown}{\overset{\diagup(CH_2)_{(nc)}}{\diagdown}}\underset{(CH_2)_{(nd)}}{\diagup}\overset{\overset{O}{\|}}{N}- \qquad (E)$$

$$-N\underset{\diagdown}{\overset{\diagup(CH_2)_{(nc)}}{\diagdown}}\underset{(CH_2)_{(nd)}}{\diagup}\overset{O}{\underset{\|}{N}}- \qquad (E')$$

wherein (nc) and (nd) are selected from 0-2 but having 6-7 ring members; and cyclic amines of 5-6 ring members; each unsubstituted or substituted by hydroxy-$C_{1-5}$ alkyl, carboxy, or lower alkyl;

ii) tetrahydrofurfuryl;

iii) mono, di, and poly saccharide radicals, whether straight chain or cyclic, their coresponding sugar alcohol radicals, pentaerythritol radicals, and polyvinyl alcohol radicals; and iv) poly hydroxy $C_2$-$C_7$ alkyl radicals; and said reactive group $R^{18}$ is capable of reacting with one or more sites in said formula I.

Preferably the hydrophilic modifier has $R^{20}$ selected from a)

$$H_2C=\overset{R^{25}}{\underset{|}{C}}-$$

and the terminus of $R^{21}$ to which it is attached is —C(O)$R^{26}$— with the carbonyl being bound to $R^{18}$ where $R^{25}$ is H or methyl and $R^{26}$ is —O—, or —NR$^{27}$— with $R^{27}$ being H or lower alkyl;

b) $H_2C=CH$— and the terminus of $R^{21}$ to which it is attached is

[benzene ring]—$R^{28}$ with the left hand bond being bound to $R^{20}$ where $R^{28}$ is —O—, —NR$^{27}$—, —C(O)—, $$-\overset{\overset{O}{\|}}{C}NR^{27}-,$$

or —C(O)O—; and c)

$$H_2C=\overset{R^{29}}{\underset{|}{C}}$$

and the terminus of $R^{21}$ to which it is attached is —C(O)$R^{30}$— in which the carbonyl is bound to $R^{20}$ wherein $R^{30}$ is lower alkylene or —[CH$_2$CH(lower alkyl)—O]—$_{1-5}$ and $R^{29}$ is hydrogen, lower alkyl, or —CN; and $R^{24}$ is preferably selected from a) morpholino which is unsubstituted or mono-tetra substituted by lower alkyl, preferably methyl or ethyl;

b)

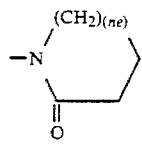

where (ne) is one, two, or three, preferably 1, each of which is unsubstituted or substituted, preferably mono or di substituted, by lower alkyl, preferably methyl or ethyl;

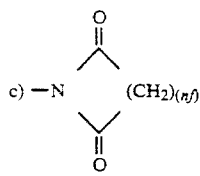

where nf is 2 or 3, preferably 2, each of is unsubstituted or substituted by lower alkyl, preferably methyl or ethyl;

d) a divalent group of the formula

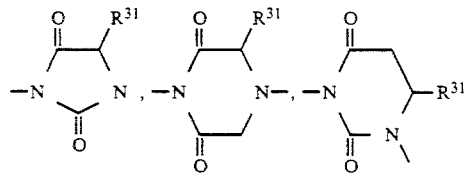

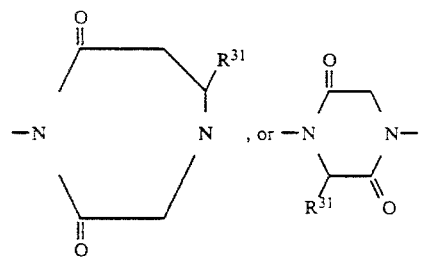

wherein $R^{31}$ is H or —COOH;

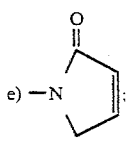

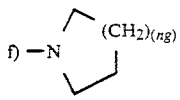

where ng is one or two, each of which is unsubstituted or substituted by lower alkyl, preferably methyl or ethyl;

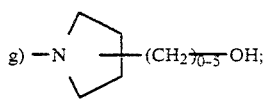

h) a polyol selected from polyvinyl alcohol radicals,

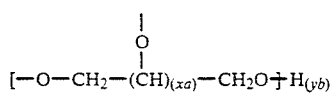

wherein (xa) is 2–10, preferably 3–4, and (yb) is an integer from 0, preferably at least 0.5(xa), up to (xa+1) inclusive, preferably (xa−2) to (xa+1), the cyclic saccharide analogs thereof, the di-tetra saccharides thereof, preferably having saccharide-saccharide links between the 1 and 4 carbon positions thereof, preferably β linkages, C(CH$_2$O)$_4$ H$_{(ya)}$ wherein (ya) is 0–3, and poly hydroxy lower alkylene glycol radicals wherein up to 50%, preferably up to 25%, more preferably up to 10%, of the hydroxy groups are missing their alcoholic hydrogens.

Most preferably the hydrophilic modifier of formula C is selected from

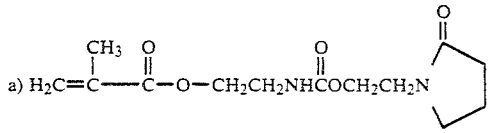

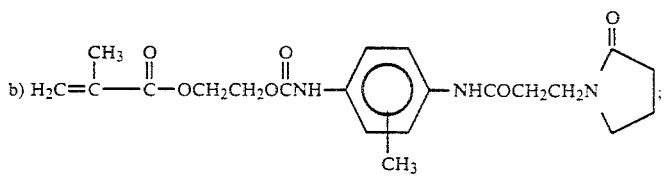

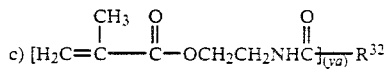

wherein $R^{32}$ is —[OCH$_2$(CH)$_{(xa)}$CH$_2$O]—H$_{(yb)}$ in which (xa) is 1–6 preferably 3–4 and (yb) is O up to (xa+1), preferably (xa−1) to (xa+1), more preferably (xa) to (xa+1), and (ya) is 1 up to (xa+2−yb)

d) 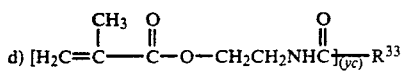

and $R^{33}$ is $C(CH_2O)_4H_{4-(yc)}$ wherein (yc) is 1–4, preferably 1–2;

e) polyvinyl alcohol having at least one and up to 50% preferably 25%, more preferably 10%, inclusive, of the alcoholic hydrogens thereof absent;

f) 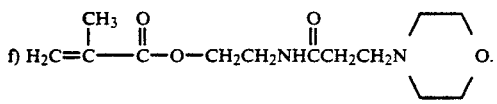

Preferably, when Cap is a vinyl containing group or one or more of the aforementioned R groups within formulae I-III contain an ethylenically unsaturated group, then the macromer can be crosslinked in the presence of a vinylic group containing hydrophilic modifier and/or vinylic group containing crosslinking agents. The instant macromer can be crosslinked in the presence or absence of up to less than about 50%, preferably up to about 30%, most preferably up to about 10% by weight of vinylically unsaturated hydrophilic modifiers and/or other vinylic comonomers.

When Cap does not have a vinylic group, but takes part in crosslinking, Cap is of formula VII. Crosslinking is then typically carried out by condensation with a tri or polyfunctional coreactive monomer. For example, when Cap terminates in OH, then the coreactive monomer functional group can be —COOH, OCN, SCN, —NH$_2$, —NH(alkyl) etc.; when Cap terminates in —NH$_2$ or —NH(alkyl), the reactive comonomer functional group can be a conventional acyl leaving group; and when Cap terminates in OCN— or SCN—, then the reactive comonomer functional group can be OH. Similarly, the other coreactive functional groups mentioned in terms of either Cap or the coreactive monomer can be interchanged.

Suitable vinylic monomers and coreactive monomers for condensation are set forth below. However, the list is not exhaustive and those of ordinary skill will appreciate the modifications, additions, and alternatives which may also be employed.

However, the degree of crosslinking in the finished crosslinked polymer should not exceed 20%, preferably not greater than 10%, more preferably not greater than 5%, still more preferably 1–4%, most preferably 2–3%.

A highly preferred embodiment within the polymers fabricated from macromers of formula I, requires that not more than 20–70%, preferably not more than 50% of the A groups are polyethylene glycol. In another highly preferred group A is homopolymeric polyethylene oxide or polypropylene oxide.

The number of A units and the chain length and nature of the substituents on the polyoxyethylene segment is determined by the degree of wettability desired in the polymer of the compound of formula I. In general, the polymer should be sufficiently hydrophilic in its surface properties such that the polymer exhibits a contact angle with distilled water at 20° C. of less than 60°, preferably less than 40°, more preferably less than 25°, still more preferably less than 15°, most preferably less than 10°.

The greater the number of siloxane units, the greater the number of oxyalkylene units is generally required to reduce the contact angle to within the above limits.

As water is taken up, the oxygen permeability of the polymers tends to be reduced. However, with the water content and swellability increased due to hydrophilic modifier the drop in Dk over the low water content analogs is surprisingly less drastic than would otherwise be expected. Advantageously, the instant polymers absorb at least 10% by weight water, preferably 15%–90% by weight, more preferably 20–85% by weight, still more preferably 25–75% by weight, most preferably 35–55% by weight water.

Highly preferred are those polymers which exhibit a contact angle of less than 25°, more preferably less than 15° and most preferably less than 10°.

The reactive vinylic macromers of the invention can characteristically be polymerized to form crosslinked polymers under conventional polymerization conditions.

If desired, the monomer reaction mixture may contain a catalytic amount of a conventional polymerization catalyst, preferably a free radical catalyst.

Of particular interest are conventional peroxide and azo catalysts, such as hydrogen peroxide, benzoyl peroxide, tert-butyl peroctoate, benzoyl peroxide or azobis (isobutyrylnitrile).

The polymerization can generally be carried out at temperatures between about 20° to about 150° C., for a period between about 1 to about 24 hours. It is understood that the time and temperature in such a reaction are inversely related. Thus, temperatures employed in the upper end of the temperature range will generally provide reaction times near the lower end of the time range. Preferrably, the polymerization is conducted in the presence of actinic radiation, such as UV light.

Depending upon the nature of the polymer mixture, it may be desirable for the polymers obtained from such polymerizations to be post cured, e.g. at a somewhat elevated temperature such as between about 60° C. to about 150° C.

For the preparation of contact lenses, the polymer mixture may be cast directly in the shape of the lens, or the polymerization may be carried out in a mold having a shape convenient for further processing, such as in the shape of small cylinders or "buttons", which can then be machined.

Minor amounts i.e. less than 50%, preferably up to 30%, and most preferably up to no more than about 10% by weight, of conventional copolymerizible vinyl monomers other than hydrophilic modifiers, can be employed as extenders, or the like, in the preparation of the instant polymer, as copolymer constituents. However, if the total hydrophilic modifier content is within the foregoing limits, the hydrophilic modifiers can also be used as such extenders. Suitable vinyl monomers include:

acylates and methacrylates of the general formula

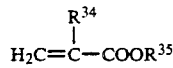

where $R^{34}$ is hydrogen or methyl and $R^{35}$ is a straight chain or branched aliphatic, cycloaliphatic or aromatic group having up to 20 carbon atoms which is unsubstituted or substituted by one or more alkoxy, alkanoyloxy or alkyl of up to 12 carbon atoms, or by halo, especially chloro or preferably fluoro, or $C_3$-$C_5$ polyalkyleneoxy of 2 to about 100 units;

acrylamides and methacrylamides of the general formula

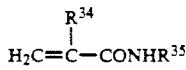

where $R^{34}$ and $R^{35}$ are defined above;
vinyl ethers of the formula

where $R^{35}$ is as defined above;
vinyl esters of the formula

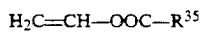

where $R^{35}$ is as defined above;
maleates and fumarates of the formula

where $R^{35}$ is as defined above;
and vinylic substituted hydrocarbons of the formula

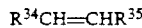

where $R^{34}$ and $R^{35}$ are as defined above.

Useful monomers include, for example:
methyl-, ethyl-, propyl-, isopropyl-, butyl-, ethoxyethyl-, methoxyethyl-, ethoxypropyl-, phenyl-, benzyl-, cyclohexyl-, hexafluoroisopropyl-, or n-octyl-acrylates and -methacrylates as well as the corresponding acrylamides and methacrylamides;

dimethylfumarate, dimethylmaleate, diethylfumarate, methyl vinyl ether, ethoxyethyl vinyl ether, vinyl acetate, vinyl propionate, vinyl benzoate, acrylonitrile, styrene, alphamethyl styrene, 1-hexene, vinyl chloride, vinyl methyl ketone, vinyl stearate, 2-hexene and 2-ethylhexyl methacrylate.

In one preferred aspect, the instant polymers are free from copolymer units of such conventional monomers which are not hydrophilic modifiers.

The vinylic monomers of formulae I-III can be prepared by methods known, per se.

For example, the siloxane/polyalkylene oxide containing divinylic monomers of formulae I-III may be prepared by reacting a siloxane diol of the formula HO—Sil—H, wherein Sil is a group of formula IV, i.e.

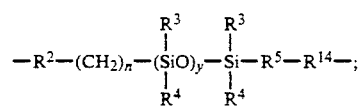

(wherein $R^{14}$ is —O—) with a sufficient amount of a difunctional reactive group containing compound at least one of which reactive groups is coreactive with OH, such as isocyanate; activated carboxy, such as an anhydride, an acid halide or a carboxy ester; or is a leaving group, such as a halide, sulfato or the like, to form the corresponding reactive group containing endcapped derivative. Such reactive compounds for forming preferred macromers include toluene diisocyanate, isophorone diisocyanate, and polyalkylene oxide mono- or di-capped by isocyanate.

The resulting endcapped siloxane derivative can then be reacted with a polyoxyalkylene diol of the formula HO—(A)—H, wherein —A— is a group of formula V above to form the corresponding polyoxyalkylene-siloxane-polyoxyalkylene diol. This diol can be then reacted with a reactive end Cap group containing monomer wherein the reactive group is an isocyanate; activated carboxy, such as an anhydride, an acid halide or carboxy ester, or is a leaving group such as halo, sulfato or the like to form the corresponding di(Cap) derivative. Alternatively, the aforementioned polyoxyalkylene-siloxane-polyoxyalkylene diols can be further sequentially reacted with a further difunctional reactive group containing compound having the group —L— to form the corresponding di-functional reactive endcapped derivative which is then reacted with a siloxane of the formula HO—Sil—H. One may continue building up alternative polyoxyalkylene/siloxane unit containing diols in this manner, as desired. Then this may be endcapped with a reactive group containing vinylic monomer having a terminal 'Cap' moiety or reacted with a sufficient amount of difunctional reactive group containing compound to endcap the diol with a reactive group, such as e.g. an isocyanate, etc. group which is then reacted with the appropriate 'Cap' containing compound, such as an vinylic amine or alcohol, or other copolymerizable monomer having a crosslinkable group to obtain the corresponding product of formula I.

Of course, instead of starting with a siloxane of the formula HO—Sil—H and building up the alternating sequence therefrom, one may instead begin with a polyoxyalkylene diol of the formula HO—(A)—H and, after endcapping the same with difunctional reactive groups, condense the same with the siloxane until the desired number alternating siloxane/polyalkylene oxide groups is attained and terminate the diol with Cap groups as described above.

Alternative synthesis of the direactive siloxane can be accomplished with a siloxane dihydride of the formula

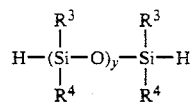

and reacting it (as known in the art) with a vinyl containing compound containing another reactive group, typically a hydroxy reactive group, such as styrene isocyanate, to yield the dicapped siloxane, such as

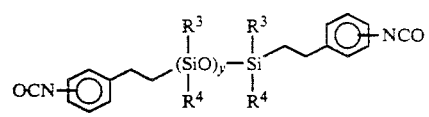

Such reactive group capped siloxane may then be used in the same manner as the reactive endcapped HO—Sil—H indicated above.

Synthesis of the macromers may be accomplished neat or in solvents as indicated in the Examples attached hereto in accordance with known synthetic techniques.

The above reactive monomers are characteristically polymerized under conventional polymerization conditions with a hydrophilic modifier of formulae A-C or a mixture Of a hydrophilic modifier of formulae A-C and a copolymerizable monomer. In those vinylic macromers containing but one vinyl group, a minor amount e.g. from about 0.01 to about 5 weight percent, based on the macromer of formula I-III, of a conventional crosslinking agent, may be employed. Suitable crosslinking agents include diolefinic monomers such as:

Allyl acrylate and methacrylate; alkylene glycol and polyalkylene glycol diacrylates and dimethacrylates, such as ethyleneglycol dimethacrylate, diethylene glycol dimethacrylate, and propylene glycol dimethacrylate; trimethylol propane triacrylate; pentaerythritol tetracrylate, divinylbenzene; divinyl ether; divinyl sulfone;

bisphenol A diacrylate or dimethacrylate; methylene bisacrylamide; diallyl phthalate; triallyl melamine and hexamethylene diacrylate and dimethacrylate. Also, such minor amounts of a crosslinking agent may be employed, if desired, in the polymerization of the divinyl monomer of formula I-II.

When the macromers of formula I have free hydroxy, isocyanato, carboxylic acid, or amine groups, suitable crosslinking agents contain di or poly functional coreactive groups to form addition or condensation reactions linking 2 or more chains.

If desired, the macromer reaction mixture may contain a catalytic amount of a conventional catalyst, preferably a free radical catalyst. Of particular interest are conventional peroxide and azo catalysts, such as hydrogen peroxide, benzoyl peroxide, tert-butyl peroctoate, benzoyl peroxide or azobis (isobutrylnitrile).

The aforementioned reactions are generally straight forward additions or condensations and are typically conducted at a reaction temperature between about $-10°$ C. to about $100°$ C., depending upon the relative reactivity of the species involved, in the presence or absence of an inert diluent and in the optional presence of an addition or condensation catalyst if desired or appropriate. For reactions involving an isocyanate or acid halide, with a diol, for example, suitable optional catalysts include pyridine and triethylamine.

In the preparation of ophthalmic devices, such as contact lenses, the reaction mixture may be cast directly in the shape of the lens, or the polymerization may be carried out in a mold having a shape convenient for further processing, such as the shape of a small cylinder or "button", which can then be machined.

The siloxane of the formula HO—Sil—H are known in the art and many are commercially readily available.

Also, the polyoxyalkylene diols of the formula HO—A—H are known or can be prepared by known methods.

Thus, the polyols of the formula HO—A—H are generally prepared by the addition reaction of $(t_4)$ times $(t_6)$ moles of an epoxide of the formula

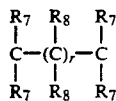

where $R^7$-$R^8$, r and $(t_4)$ and $(t_6)$ are as defined above, with $(t_5)$ times $(t_6)$ of a different epoxide of formula IX wherein $(t_5)$ is as defined above, optionally in the presence of a conventional alkylation catalyst, at atmospheric to elevated pressures of up to about 30 atmospheres gauge, at temperatures between $0°$ C. to about $130°$ C., optionally in the presence of an inert diluent. If desired, one may add to the reaction mixture, prior to the reaction of the epoxides, an aliphatic, aromatic or cycloaliphatic alcohol, acid or amine having up to 14 carbon atoms to prepare the corresponding mono-ols.

The reaction between the epoxides, when mixtures of different epoxides are employed to obtain the polyol of the formula HO—A—H, can be conducted by admixing the epoxides to obtain random copolymers or terpolymers, etc., or the addition can be conducted sequentially to form block copolymers having terminal hydroxy groups. Suitable catalysts include alkaline earth oxides, alkaline earth carbonates, alkyl zinc compounds, aluminum alkoxides, hydrates of ferric chloride, bromide and acetate, and gamma radiation. The reaction may also by initiated by the presence of a glycol, such as ethylene glycol or propylene glycol or by a polyol of higher functionality such as sucrose, or by an amine, such as ethylene diamine, toluenediamine, and so forth. Generally the length of time of the reaction will depend in part on the alkylene oxide employed, but can generally be from less than one to several score hours. Thus, ethylene oxide generally is about three times as active as propylene oxide, which in turn reacts more rapidly than 1,2-butylene oxide. The preparation of polyoxitanes and polytetrahydrofurans are generally initiated via ring opening oxonium formation using trialkyloxonium salts, carboxonium salts, acylium salts and the like.

Suitable diols of the formula HO—A—H include those prepared from epoxides such as:

1,2-propylene oxide; 1,2-butylene oxide; 1,2-epoxydecane; 1,2-epoxydodecane; 1,2-epoxyoctane; 2,3-epoxynorbornane; 1,2-epoxy-3-ethoxypropane; 1,2-epoxy-3-phenoxypropane; 2,3-epoxypropyl 4-methoxyphenyl ether; tetrahydrofuran; 1,2-epoxy-3-cyclohexyloxypropane; oxetane; 1,2-epoxy-5-hexene; 1,2-epoxyethylbenzene; 1,2-epoxy-1 methoxy-2-methylpropane; perfluorohexylethoxypropylene oxide; benzyloxypropylene oxide; and the like. Also, the aforementioned epoxides may be employed as mixtures thereof. Further, certain cyclic ethers of formula IX, r is 3 and the carbocyclic portion of the ring is substituted are resistant to polymerization alone, copolymerize quite readily with more reactive cyclic ethers. Suitable co-monomers include, for example, 2-methyl-tetrahydrofuran and 3-methyl-tetrahydrofuran. Also, while ethylene oxide may be employed as a co-monomer, ethylene oxide polymers, in the absence of more hydrophobic units, is characteristically too hydrophilic and absorbs too much aqueous fluid to be of use in accordance with the instant invention. However, ethylene oxide/propylene oxide copolymeric diols wherein there is 30–80%, preferably greater than 50% more preferably greater than 66%, propylene oxide, on a mole basis is sufficiently hydrophobic so as to be substantially non-swellable in aqueous media, and yet sufficiently hydrophilic so as to exhibit a contact angle with water of less than $60°$, preferably less than $40°$, more preferably less than $25°$, still more preferably less than $15°$, most preferably less than $10°$.

Many polymer diols of the formula HO—A—H are commercially available. Thus, suitable diol products include poloxamers having the general formula

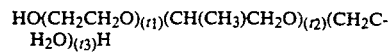

wherein $t_2$ has a value between about 16 and 100 and the sum of $t_1$ and $t_3$ is between about 4 to about 100. While each of the following poloxamers is beyond the current definition of the preferable A groups, they may be used to form the non-preferable A groups within any one macromer. For example, if 30% of the A groups in a macromer are poloxamers of $(t_1)=5$, $(t_2)=15$, $(t_3)=5$, then the remainder of the A groups in that macromer may be any of the poloxamers set forth below. Examples of such poloxamers, and their average values of $t_1$, $t_2$ and $t_3$, include poloxamer 101 ($t_1$ is 2, $t_2$ is 16, $t_3$ is 2); poloxamer 122 ($t_1$ is 5, $t_2$ is 21, $t_3$ is 5); poloxamer 181 ($t_1$ is 3, $t_2$ is 30, $t_3$ is 3); poloxamer 212 ($t_1$ is 8, $t_2$ is 35, $t_3$ is 8); poloxamer 231 ($t_1$ is 6, $t_2$ is 39, $t_3$ is 6); poloxamer 282 ($t_1$ is 10, $t_2$ is 47, $t_3$ is 10); poloxamer 331 ($t_1$ is 7, $t_2$ is 54, $t_3$ is 7); poloxamer 401 ($t_1$ is 6, $t_2$ is 67, $t_3$ is 6).

Such poloxamers are available, e.g. from BASF Wyandotte under their Pluronic ® brand name. Also suitable are the "reverse poloxamers", having polyethylene glycol bounded on each side by polypropylene glycol.

Polypropylene ether glycols include commercially available products having a molecular weight range between about 400 to about 4,000.

The hydrophilic modifiers can be prepared as disclosed in the concurrently filed U.S. patent application Ser. No. 160,623, filed Feb. 26, 1988, now U.S. Pat. No. 4,859,780, entitled HYDROPHILIC MODIFIER MONOMERS, invented by Frank Molock, Richard Robertson, Jr., and Kai C. Su.

Typically, conventional fully swollen polyhydroxyethyl methacrylate lenses which are sparingly crosslinked possess a $Dk(\times 10^{-10}$ mm. $ccO_2/cm.^2sec.mmHg)$ value of about 5-7.

The oxygen permeability of the instant polymers for use as an ophthalmic device, such as a contact lens, advantageously possess a $Dk(\times 10^{-10}$ mm $ccO^2/cm.^2sec.mmHg)$ value generally greater than 7-10, preferably greater than about 15, more preferably greater than about 20, still more preferably greater than about 40, yet more preferably greater than 80, even more preferably greater than 100, most preferably at least 150.

The following examples are for illustrative purposes and are not to be construed as limiting the invention. All parts are by weight unless otherwise specified.

EXAMPLE 1

1.0 mole of propylene glycol (previously dried using 4A molecular sieves) and 3% by weight KOH are added to a stainless steel reactor, purged with nitrogen 5-7 times and then evacuated to 0 psig for at least 20-30 minutes. During this time period, the reaction mixture is gradually heated to 100° C. The reaction mixture vacuum is broken with a nitrogen sparge to approximately 1-2 psig. Then 4 mole of ethylene oxide is added in a manner so as not to exceed a temperature of 180° C. and a pressure of 80 psig. The ethylene oxide is reacted down to 3-4 psig. 11.5 mole of propylene oxide is then added to the reaction mixture in such a manner as not to exceed a temperature of 180° C. and a pressure of 80 psig, which is then reacted down to 3-4 psig. The additions of ethylene oxide and propylene oxide, in the same molar ratios, are repeated until the desired molecular weight is achieved. The mixture is then stripped at 100C to 0 psig to remove any residual oxides, after which the mixture is neutralized and dried. Diol 1 has a molecular weight of 1,480 and Diol 2 has a molecular weight of 4,740. In each of Diol 1 and Diol 2, the blocks of polyethylene glycol are no longer than 3 ethylene oxide units, while the blocks of polypropylene glycol are no longer than 7 propylene oxide units.

EXAMPLE 2

To a dry, 0.25-liter, three-neck flask equipped with a thermometer, constant pressure dropping funnel, nitrogen inlet and condenser under a dry, nitrogen atmosphere is added 1.74 grams (0.010 moles) toluene diisocyanate, 10 milliliters dry methylene chloride and 0.05 grams tin octoate. 0.005 moles of a diol in Example 1 in 40 ml of dry methylene chloride are added to the flask dropwise over a 40 minute period, maintaining a temperature less than 30° C. The reaction is continued for 2 hours. After two hours, 14.65 grams (0.010 moles) hydroxybutyl terminated polydimethylsiloxane in 30 milliliters of dry methylene chloride are added rapidly to the system and the reaction allowed to continue 17 hours. Then 1.74 grams (0.010 moles) toluene diisocyanate were added; and after 3 hours, 1.30 grams (0.010 moles) 2-hydroxyethylmethacrylate were added and the reaction stirred 18 hours. After 18 hours, the isocyanate band is not apparent in the infrared spectrum. The volatiles are then removed from the reaction system via vacuum rotary evaporation. The clear, viscous, reactive fluid is stored protected from light and thermal polymerization.

To the clear, viscous fluid is added one percent Darocur 1173 (UV initiator) and the mixture degassed and mixed via vacuum rotary evaporation. The material is then UV cured in the appropriate molds under UV light with an intensity of two to three milliwatts.

EXAMPLE 3

Similar reactions were conducted as described in Example 2 but with reactive components of different molecular weights and other variations as outlined in Table 1. The solvents were adjusted proportionally based on the weight of the materials used.

TABLE 1*

| Ex. | Diol | Silicone | TDI | HEMA | Tin Octoate | Darocur |
|---|---|---|---|---|---|---|
| 3 | (.01) | 40.03 (.02) | 6.96 (.04) | 2.60 (.02) | .06 | 1% |

*Weight is in grams.
Number in parentheses is molar quantity.
Initiator expressed in terms of percent of prepolymer in grams.

EXAMPLE 4

To a dry, 100-milliliter, three-neck flask equipped with a thermometer, constant pressure dropping funnel, nitrogen inlet and condenser under a dry, nitrogen atmosphere is added 3.48 grams (0.020 moles) toluene diisocyanate, 150 ml dry methylene chloride and dibutyl tin dilaurate and heat to reflux. 4-Hydroxybutyl polydimethylsiloxane 14.65 grams (0.010 moles) in 30 milliliters of dry methylene chloride are added dropwise to the flask. After 3 hours, (0.005 moles) of a diol of Example 1 are added to the flask dropwise. The reaction is stirred at reflux for four hours and 1.30 grams (0.010 moles) of 2-hydroxyethylmethacrylate are charged to the flask. After 17 hours the isocyanate band is no longer observed in the infrared spectrum. The volaties removed via vacuum rotary evaporation. The clear, viscous, reactive fluid is protected from light and thermal polymerization until it is ready for use.

One percent Darocur 1173 is added to the prepolymer and the mixture degassed and mixed via vacuum rotary evaporation. The prepolymer was transferred to the appropriate molds and cured under UV light of three to five milliwatt intensity.

EXAMPLE 5

To a dry, 100 milliliter, three-neck flask equipped with a thermometer, constant pressure dropping funnel, nitrogen inlet and condenser under a dry, nitrogen atmosphere is added 3.48 grams (0.020 moles) toluene diisocyanate, 150 ml dry methylene chloride and dibutyl tin dilaurate and heat to reflux. 4-Hydroxybutyl polydimethylsiloxane 14.65 grams (0.010 moles) in 30 milliliters of dry methylene chloride are added dropwise to the flask. After 3 hours, 0.005 moles of a diol of Example 1 are added to the flask dropwise. The reaction is stirred at reflux for four hours and 1.30 grams (0.010 moles) of 2-hydroxyethylmethacrylate are charged to the flask. After 17 hours the isocyanate band is no longer observed in the infrared spectrum. The volaties removed via vacuum rotary evaporation. The clear, viscous, reactive fluid is protected from light and thermal polymerization until it is ready for use.

20 Percent by weight of PPGMM (Alcolac) and one percent Darocur 1173 is added to the prepolymer and the mixture degassed and mixed via vacuum rotary evaporation. The prepolymer was transferred to the appropriate molds and cured under UV light of three to five milliwatt per square centimeter intensity.

We claim:

1. A macromer comprising a segment, Seg, of the formula

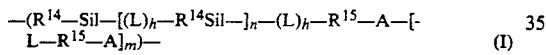

—(R$^{14}$—Sil—[(L)$_h$—R$^{14}$Sil—]$_n$—(L)$_h$—R$^{15}$—A—[-L—R$^{15}$—A]$_m$)—    (I)

wherein

R$^{14}$ is a bond or —N(R$^1$)—, or if R$^{14}$ is not attached to a silicon atom, then R$^{14}$ may also be —O—;

R$^{15}$ is —O— or —N(R$^1$)—;

R$^1$ is H, C$_1$-C$_4$-alkyl or phenyl;

n is 0–3;

m is 0–3;

h is 1, or h may be 0 when the atom Sil to which it would otherwise be attached is carbon;

each Sil is independently of the formula

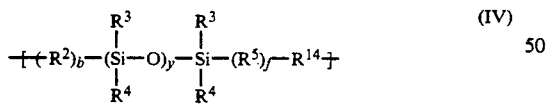

$$-\!\!+\!(R^2)_b-(Si-O)_y-Si-(R^5)_f-R^{14}\!\!+\!-$$
(with R$^3$, R$^4$ substituents)    (IV)

each L is independently of the formula

—L$^1$—R$^6$—L$^2$— each A is independently of the formula

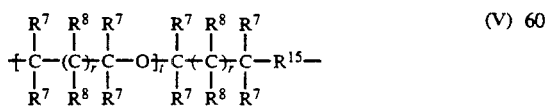

(V)

each R$^2$ and R$^5$ are independently C$_1$-C$_4$-alkylene, carbonyl, C$_1$-C$_6$-alkylene-carbonyl, C$_1$-C$_4$-alkylene-(oxy-C$_1$-C$_4$-alkylene)$_g$ or C$_1$-C$_4$-alkylene-OCH$_2$-(hydroxy C$_1$-C$_4$alkylene)-CH$_2$—;

with g being an integer from 1 to 10;

each b and each f is independently 0 or 1;

each y is independently 1 to 200;

each R$^3$ and each R$^4$ are independently selected from C$_1$-C$_{18}$-alkyl or aryl of up to 12 carbon atoms;

each L$^1$ and each L$^2$ are independently —COO— or —CONH— in which the oxygen or nitrogen is bound to R$^6$, —CO— or a bond;

each R$^6$ is independently (i) —(C$_1$-C$_{25}$-aliphatic)— or (ii) of the formula

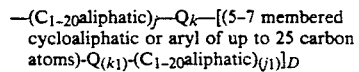

—(C$_{1-20}$aliphatic)$_j$—Q$_k$—[(5–7 membered cycloaliphatic or aryl of up to 25 carbon atoms)-Q$_{(k1)}$-(C$_{1-20}$aliphatic)$_{(j1)}$]$_D$ in which each q is independently 0–3;

each j, each k, each (j$_1$) and each (k$_1$) are 0 or 1, but if j is 0, k is 0; and if (j$_1$) is 0, (k$_1$) is 0;

each D is 1 to 3;

each aliphatic group in R$^6$ (i) or (ii) above is uninterrupted at any point by Q;

each aliphatic, cycloaliphatic or aryl group within R$^6$ (i) or (ii) above is unsubstituted or substituted by one or more substituents which substituents are halogen, hydroxy, C$_1$-C$_4$alkyl, carboxy or C$_1$-C$_{12}$-perhaloalkyl;

each Q is independently selected from —O—, —COO—, —OCO—, —N(R$^1$)—, —N(R$^1$)CO—, —CON(R$^1$)—, —OOCN(R$^1$)—, —N(R$^1$)COO—, —OCOO— or —N(R$^1$)CON(R$^1$)—;

each r is independently 0–4;

each t is independently 3–200;

each R$^7$ is independently selected from groups (a) or (c) and each R$^8$ is independently selected from the groups (a), (b), (c) or (d);

(a) hydrogen, halogen, C$_1$-C$_{16}$-alkyl, C$_2$-C$_{16}$-alkenyl, or said alkyl or said alkenyl substituted by fluoro, by C$_1$-C$_{16}$-alkoxy, by C$_2$-C$_{16}$-alkanoyloxy, by C$_1$-C$_{16}$-alkoxy-CC-C$_2$-C$_{16}$-alkenyloxy-CO-, by C$_3$-C$_{16}$-alkenoyloxy, by aryl of up to 10 carbon atoms, by aroyl of up to 11 carbon atoms, by aroyloxy of up to 11 carbon atoms, by aryl of up to 10 carbon atoms-oxycarbonyl, by C$_3$-C$_8$-cycloalkyl, by C$_3$-C$_8$-cycloalkoxy, by C$_3$-C$_8$-cycloalkylcarbonyloxy, by C$_3$-C$_8$-cycloalkoxycarbonyl, by oxacycloalkyl of up to 7 carbon atoms, by oxacycloalkoxy of up to 7 carbon atoms, by oxacycloalkoxy of up to 7 carbon atoms-carbonyl or by oxacycloalkyl of up to 7 carbon atoms-carbonyloxy; with the proviso that the alkoxy substituent in (a) is not bound to a carbon atom already single bound to another oxygen atom;

(b) C$_1$-C$_{16}$-alkoxy, C$_2$-C$_{16}$-alkanoyloxy, C$_1$-C$_{16}$-alkoxy-CO-, C$_2$-C$_{16}$-alkenyloxy-CO- or C$_3$-C$_{16}$-alkenoyloxy, or any of said groups substituted by fluoro, by aryl of up to 10 carbon atoms or by C$_1$-C$_6$-alkoxy provided said alkoxy is not bound to a carbon atom which is singly bound to another oxygen atom;

(c) aryl of up to 10 carbon atoms, C$_3$-C$_8$-cycloalkyl or oxacycloalkyl of up to 7 carbon atoms, each of which is unsubstituted or substituted by a substituent selected from those indicated in (a) and (b) above; or (d) aryloxy of up to 10 carbon atoms, cycloalkoxy of up to 8 carbon atoms, cycloalkyl of up to 8 carbon atoms-COO—, cycloalkoxy of up to 8 carbon atoms-carbonyl, aroyloxy of up to 11 carbon atoms, oxacycloalkoxy of up to 7 carbon atoms, oxacycloalkenyloxy of up to 7 carbon atoms, oxacycloalkoxy of up to 7 carbon atoms-carbonyl, oxacycloalkyl of up to 7 carbon atoms-carbonyloxy, aryloxy of up to 11 carbon atoms or aroyloxy of up to 11 carbon atoms, or any of said groups substituted by fluoro, by $C_1$-$C_6$-alkyl or by $C_1$-$C_6$-alkoxy provided said alkoxy substituent is not bound to a carbon atom which is singly bound to another oxygen atom; or two adjacent $R^7$ and $R^8$ groups together with the atoms to which they are attached may form a 5-8 membered cycloalkyl, cycloalkenyl or oxacycloalkyl ring; or a 6-14 membered bicyclo-ring; and with the proviso that at least 30% of the A groups contain no subblock in excess of 15 repeating units and where the A groups are copolymeric groups of the —E—X—E— type where the X subblock has approximately twice the number of repeating units as either subblock E has.

2. The macromer of claim 1 comprising a segment, Seg., in a group, Grp, of the formula $$-R^{15}-A-[L-R^{15}-A]_m(L)_h]_a[Seg-(L)_h]_p-Seg[(L)_h-R^{14}-Sil-[(L)_h-R^{14}-Sil]_h]_e \quad (II)$$

wherein $R^{14}$, $R^{15}$, L, Seg, Sil, h and A are as defined in claim 1;

m is an integer of 0–10;
n is an integer of 0–3;
p is an integer of 0–7; and
a and e are each 0 or 1, but a+e=1.

3. The macromer of claim 2 of the formula

Cap—Grp—Cap    III wherein
Grp is as defined in claim 2;
each Cap is independently selected from formula VI or VII below provided at least one Cap per macromer is of formula VI; wherein formula VI is $$R^{16}(L^4)_z(R^6)_w(A^1)_Y(L^3)_x[J(R^9)_M(L^5)_G(R^6)_T(L^6)_T]_z \quad (VI)$$

and formula VII is $$R^{17}(L^4)_z(R^6)_w(A^1)_Y(L^3)_x[J(R^9)_M(L^5)_G(R^6)_T(L^6)_T]_z \quad (VII)$$

in which
each $R^6$ is as defined in claim 2;
each w, x and z are independently 0 or 1, but if w is 0, then one of x and z must be 0;
each G, M, T, V, Y and Z is independently 0 or 1, but if Y is 0, then G must be zero and M must be one;
each J is —O— or —NH—;
each $A^1$ and $R^9$ is independently of the formula

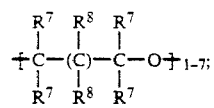

each
$L^3$ is independently $$-\overset{O}{\underset{\|}{C}}-, \quad -O-\overset{O}{\underset{\|}{C}}-, \quad \text{or} \quad -N(R^1)\overset{O}{\underset{\|}{C}}-$$

with the right hand portion attached to Grp provided that the atom of Grp to which $L^3$ is attached is not a carbonyl carbon an amido nitrogen or a carboxy oxygen and $L^3$ is —O— or —NR$^1$— when the atom of Grp to which it is attached is a carbonyl carbon;

each $L^4$ is independently $$-\overset{O}{\underset{\|}{C}}-, \ -O\overset{O}{\underset{\|}{C}}-, \ -\overset{O}{\underset{\|}{C}}-O, \ -NR^1\overset{O}{\underset{\|}{C}}-, \ -\overset{O}{\underset{\|}{C}}NR^1-,$$

$$-O\overset{O}{\underset{\|}{C}}O-, \ -N(R^1)\overset{O}{\underset{\|}{C}}N(R^1)- \text{ or } -N(R^1)\overset{O}{\underset{\|}{C}}O-$$

when w is one, and selected from the same group as $L^3$ when w is zero;
each $L^5$ is $$-\overset{O}{\underset{\|}{C}}NH-$$

with the carbonyl attached to $R^9$ or J;
each $L^6$ is $$-\overset{O}{\underset{\|}{C}}NH-$$

with the nitrogen attached to $R^6$ or $R^9$;
each $R^{16}$ is independently of the formula $$\begin{array}{c} R^{10} \\ \diagdown \\ R^{11} \diagup \end{array} C=C \begin{array}{c} R^{12} \\ | \\ - \end{array} \quad (VIII)$$

in which $R^{12}$ is hydrogen or $C_{1-7}$alkyl and each of $R^{10}$ and $R^{11}$ is independently H, $C_{1-7}$alkyl, or —COOR$^{13}$ with $R^{13}$ being H or $C_{1-4}$ alkyl;
and $R^{17}$ is selected from
a) H, NH$_2$, OH, —NCO, —NCS, $$-\overset{O}{\underset{\|}{C}}\text{-halogen}$$

or COOR$^{12}$ when the non-$R^{17}$ atom to which it is attached is a non-carbonyl saturated carbon or the non-$R^{17}$ atom to which it is attached is a carbon which is part of a ring;
b) H, $$-\overset{O}{\underset{\|}{C}}\text{ halogen}, \ -\overset{O}{\underset{\|}{C}}-R^{12}, \ -\overset{O}{\underset{\|}{C}}-OR^{12}$$

and $R^{12}$ when the non-$R^{17}$ atom to which it is attached is an oxygen other than a carboxy oxygen;
c) H and $R^{12}$, when the non-$R^{17}$ atom to which it is attached is a carboxy oxygen;
d)

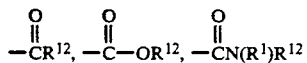 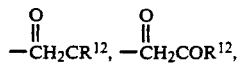
and $R^{12}$ when the non-$R^{17}$ atom to which it is attached is an amino nitrogen, or $R^{12}$ when the non-$R^{17}$ atom to which it is attached is an amido nitrogen;
e) OH, $R^{12}$,
$NH_2$, —$NHR^{12}$ when the non-$R^{17}$ atom to which it is attached is a carboxy carbon; or
f) H, OH, hal, —$OR^{12}$ when the non-$R^{17}$ atom to which it is attached is silicon.
* * * * *